(12) United States Patent
Misu et al.

(10) Patent No.: US 11,447,004 B2
(45) Date of Patent: Sep. 20, 2022

(54) IN-WHEEL MOTOR VEHICLE DRIVE APPARATUS

(71) Applicant: AISIN CORPORATION, Aichi (JP)

(72) Inventors: Takahiro Misu, Kariya (JP); Kohsuke Murata, Kyoto (JP)

(73) Assignee: AISIN CORPORATION, Kariya (JP)

( * ) Notice: Subject to any disclaimer, the term of this patent is extended or adjusted under 35 U.S.C. 154(b) by 280 days.

(21) Appl. No.: 16/906,032

(22) Filed: Jun. 19, 2020

(65) Prior Publication Data
US 2021/0001711 A1  Jan. 7, 2021

(30) Foreign Application Priority Data
Jul. 3, 2019  (JP) .............................. JP2019-124350

(51) Int. Cl.
*B60K 17/04* (2006.01)
*B60K 7/00* (2006.01)
*F16H 57/04* (2010.01)
*F04C 2/10* (2006.01)

(52) U.S. Cl.
CPC .......... *B60K 7/0007* (2013.01); *B60K 17/046* (2013.01); *F04C 2/10* (2013.01); *F16H 57/042* (2013.01); *F16H 57/043* (2013.01); *F16H 57/0436* (2013.01); *B60K 2007/0061* (2013.01); *F16H 57/0482* (2013.01)

(58) Field of Classification Search
CPC ....... B60K 7/0007; B60K 17/046; F04C 2/10; F16H 57/04; F16H 57/043; F16H 57/0436; F16H 57/0441
See application file for complete search history.

(56) References Cited

U.S. PATENT DOCUMENTS

| 7,828,095 B2 * | 11/2010 | Murata ................... H02K 5/203 180/65.6 |
| 2008/0035407 A1 | 2/2008 | Murata et al. |
| 2008/0083572 A1 * | 4/2008 | Ishida .................. B60K 7/0007 180/55 |
| 2018/0294692 A1 * | 10/2018 | Sato ......................... B60K 7/00 |

FOREIGN PATENT DOCUMENTS

JP  4501911 B2  7/2010

* cited by examiner

*Primary Examiner* — Derek D Knight
(74) *Attorney, Agent, or Firm* — Oblon, McClelland, Maier & Neustadt, L.L.P.

(57) ABSTRACT

An in-wheel motor vehicle drive device includes an electric motor driving a drive gear, and the drive gear provided with a gear portion configured to receive drive force of the drive gear and a first wall surface extending along a direction orthogonal to an extending direction of a rotation center axis of the gear portion, the first wall surface for forming a pump chamber. The in-wheel motor vehicle drive device further includes a hub configured to transmit the drive force to the wheel, and an oil pump driven by the electric motor. The oil pump includes an oil pump cover including a second wall surface facing the first wall surface of the pump chamber, and a pump rotator arranged at a space between the first wall surface of the driven gear and the second wall surface of the oil pump cover, the pump rotator integrally rotating with the driven gear.

6 Claims, 9 Drawing Sheets

IN-WHEEL MOTOR VEHICLE DRIVE APPARATUS

CROSS REFERENCE TO RELATED APPLICATIONS

This application is based on and claims priority under 35 U.S.C. § 119 to Japanese Patent Application 2019-124350, filed on Jul. 3, 2019, the entire content of which is incorporated herein by reference.

TECHNICAL FIELD

This disclosure generally relates to an in-wheel motor vehicle drive device.

BACKGROUND DISCUSSION

A known in-wheel motor vehicle drive device including an electric motor is disclosed in JP4501911B (hereinafter referred to as Patent reference 1).

The Patent reference 1 discloses an in-wheel motor structure (an in-wheel motor vehicle drive device) including a motor (an electric motor). The in-wheel motor structure includes an outer wheel member, a counter gear, and an oil pump. The outer wheel member rotates a wheel by drive force of a motor transmitted via the counter gear. The outer wheel member and the counter gear are coaxially arranged on a rotation center axis. The counter gear includes the oil pump therein.

The oil pump disclosed in Patent reference 1 includes an inner rotor, a pump body, and a pump side cover which are coaxially arranged on the rotation center axis. The pump body and the pump side cover are separately provided from the counter gear. The pump body and the pump side cover each includes an inner wall surface for forming a pump chamber to and from which oil introduces and discharges.

The in-wheel motor structure disclosed in Patent reference 1 is formed with the pump chamber by the pump body and the pump side cover which are exclusive members or dedicated members of the oil pump, and the dimension of the counter gear in an extending direction of the rotation center axis increases by a length required for having both the pump body and the pump side cover inside the counter gear. The pump chamber of the oil pump is formed by the dedicated members of the oil pump, which are the pump body and the pump side cover, and the number of the components of the oil pump cannot be decreased. As a result, the in-wheel motor structure disclosed in Patent reference 1 may not decrease the number of the components of the oil pump and prevent the increase of the dimension of the in-wheel motor structure or the in-wheel motor vehicle drive device in the extending direction of the rotation center axis.

A need thus exists for an in-wheel motor structure which is not susceptible to the drawback mentioned above.

SUMMARY

According to an aspect of this disclosure, an in-wheel motor vehicle drive device includes an electric motor including a drive gear generating drive force for driving a wheel, the electric motor driving the drive gear, and a driven gear including a gear portion configured to the receive drive force of the drive gear, and a first wall surface extending along a direction orthogonal to an extending direction of a rotation center axis of the gear portion, the first wall surface for forming a pump chamber to and from which oil is introduced and discharged. The in-wheel motor vehicle drive device further includes a hub configured to transmit the drive force of the driven gear to the wheel, and an oil pump driven by the electric motor. The oil pump includes an oil pump cover including a second wall surface facing the first wall surface of the pump chamber, and a pump rotator arranged at a space between the first wall surface of the driven gear and the second wall surface of the oil pump cover, the pump rotator integrally rotating with the driven gear.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the disclosure will hereunder be explained with reference to drawings.

A structure of an in-wheel motor vehicle drive device 100 of the embodiment will be explained with reference to FIGS. 1 to 11.

Figure 1:
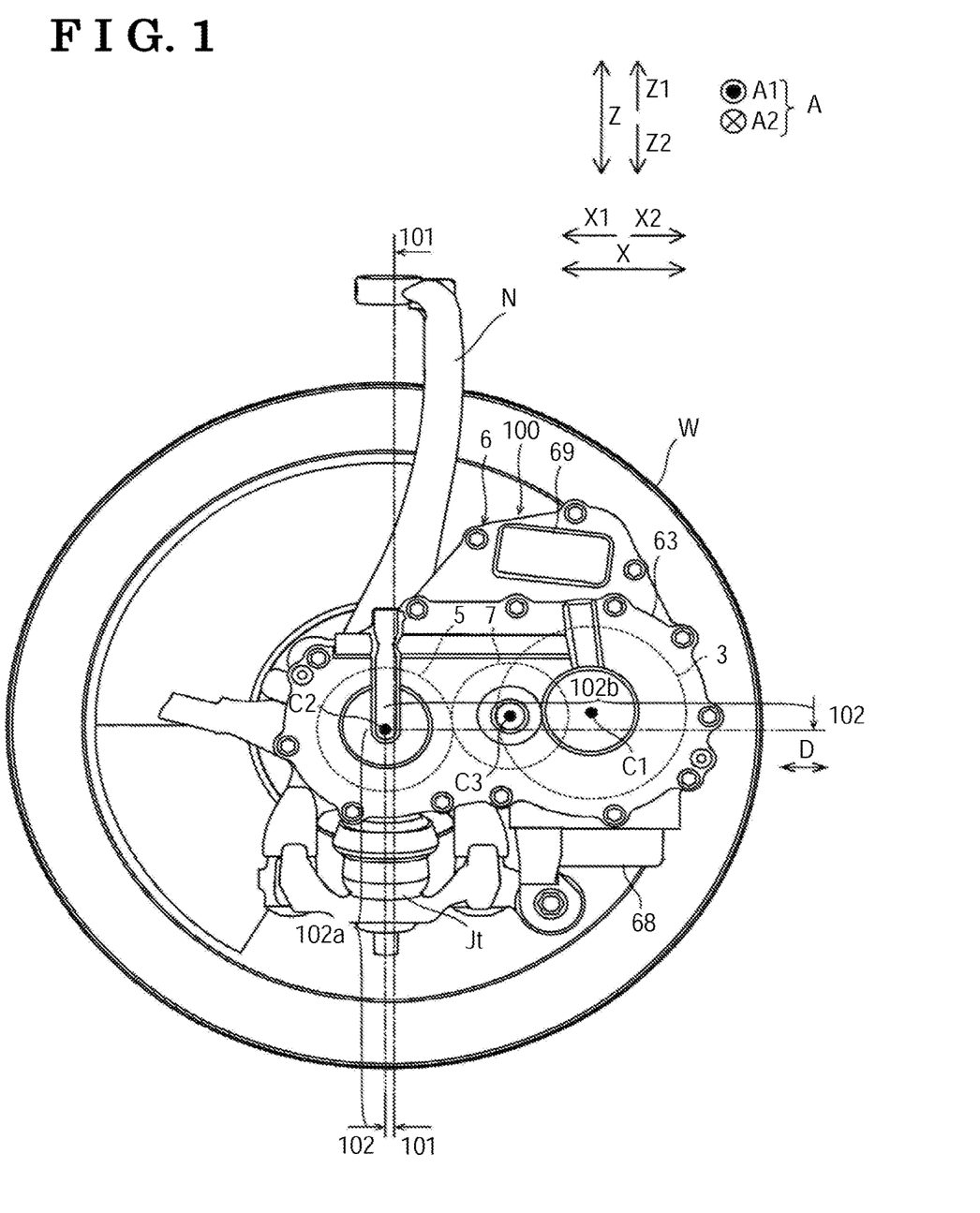
FIG. 1 is a front view of an in-wheel motor vehicle drive device of an embodiment disclosed here, seen in an A1 direction when being arranged within a wheel.
Figure 2:
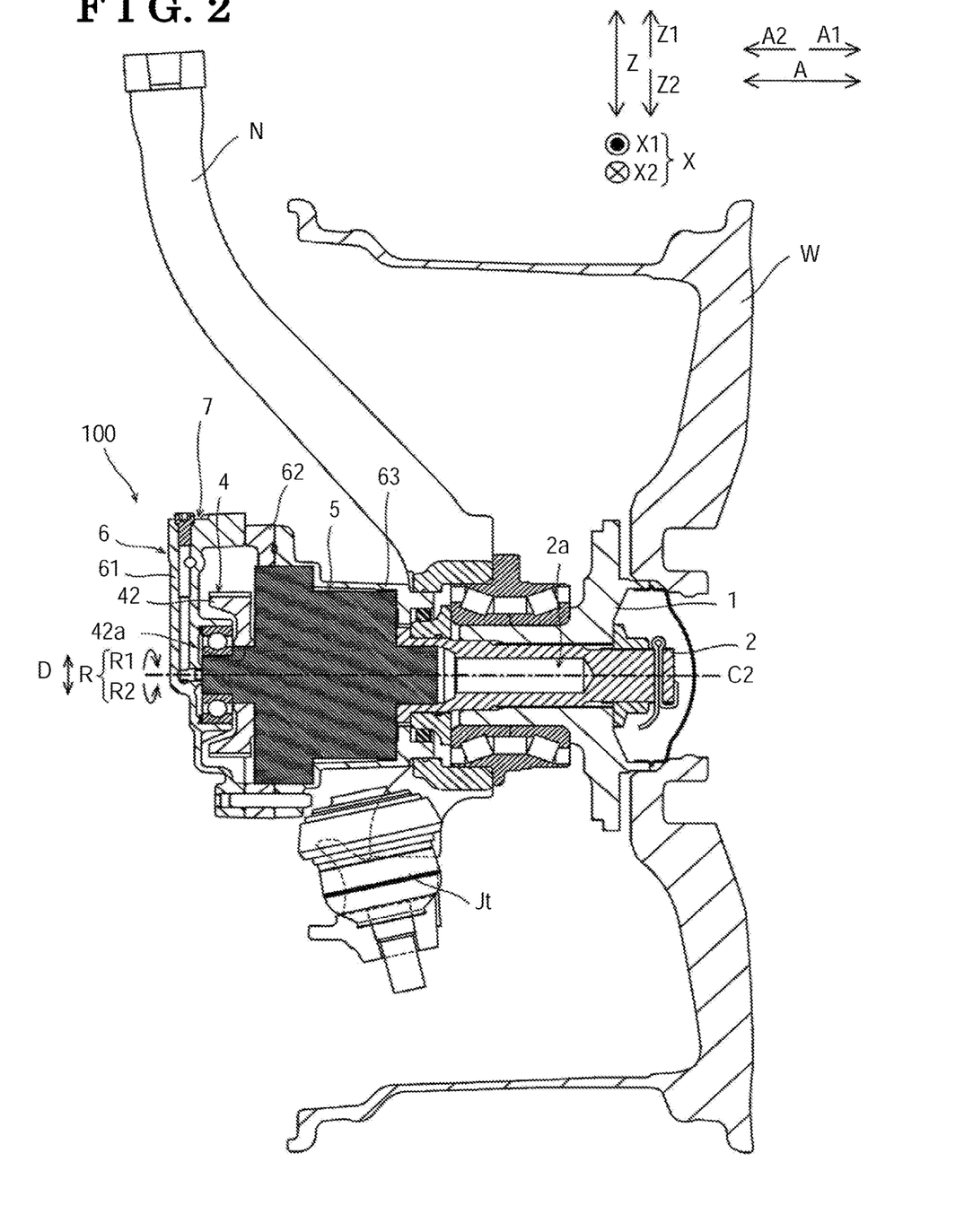
FIG. 2 is a cross sectional view taken along line 101-101 in FIG. 1.

As shown in FIGS. 1 and 2, the in-wheel motor vehicle drive device 100 is configured to move a vehicle forward or backward by rotating a wheel W by transmitting drive force of an electric motor 3 arranged within the wheel W of the vehicle to a hub 1. In other words, the in-wheel motor vehicle drive device 100 includes a drive source moving the vehicle frontward and backward and a drive force transmission mechanism transmitting drive force of the drive source.

Here, an extending direction of a rotation center axis C2 of the wheel W corresponds to an A direction (an axial direction). A direction approaching the wheel W corresponds to an A1 direction, and a direction approaching a vehicle body or a body corresponds to an A2 direction. A direction orthogonal to the extending direction the rotation center axis C2 of the wheel W corresponds to a D direction (a radial direction). A direction around the rotation center axis C2 of the wheel W corresponds to an R direction (a circumferential direction). One direction in the R direction corresponds to an R1 direction, and the other direction in the R direction corresponds to an R2 direction.

A direction the vehicle moves corresponds to a X direction. A direction the vehicle moves forward corresponds to a X1 direction, and a direction the vehicle moves backward corresponds to a X2 direction. An upper-lower direction of the vehicle corresponds to a Z direction. The upper direction of the vehicle corresponds to a Z1 direction, and the lower direction of the vehicle corresponds to a Z2 direction.

Hereinafter, the in-wheel motor vehicle drive device 100 of the wheel W of the plural wheels W attached to the vehicle in the X1 direction and in the X2 direction will be explained. The configuration of the in-wheel motor vehicle drive device 100 provided in the plural wheel W includes the same configuration.

Here, at least a part of the in-wheel motor vehicle drive device 100 is housed or accommodated in the wheel W. The wheel W includes a substantially cylindrical shape opening in the A2 direction. The wheel W is provided with a knuckle N and a ball joint Jt. The knuckle N is a member for supporting the wheels including the wheel W, suspending the vehicle body, and steering the wheel of the vehicle. The ball joint Jt is a member serving as an end of a rotation center of the wheel when the wheel of the vehicle is steered.

Specifically, the in-wheel motor vehicle drive device 100 includes the hub 1, a shaft 2, the electric motor 3, a transmission mechanism 4, a planetary gear mechanism 5, an accommodation member 6, and an oil pump 7.

The hub 1 transmits drive force of the shaft 2 to the wheel W, and is fixed on the shaft 2 so as to be integrally rotatable therewith. The shaft 2 transmits drive force of the planetary gear mechanism 5 to the hub 1. The shaft 2 rotates by torque of the electric motor 3 transmitted via the planetary gear mechanism 5. The shaft 2 is provided with a weight-decreasing hole 2a therein, the weight-decreasing hole 2a including a part of the planetary gear mechanism 5 therein. The planetary gear mechanism 5 receives drive force of the electric motor 3 via the transmission mechanism 4. In other words, the planetary gear mechanism 5 rotates by the torque of the electric motor 3 transmitted via the transmission mechanism 4. As such, the hub 1 transmits drive force of an idler gear 41 (i.e., serving as a driven gear) of the transmission mechanism 4 to the wheel W.

Figure 3:
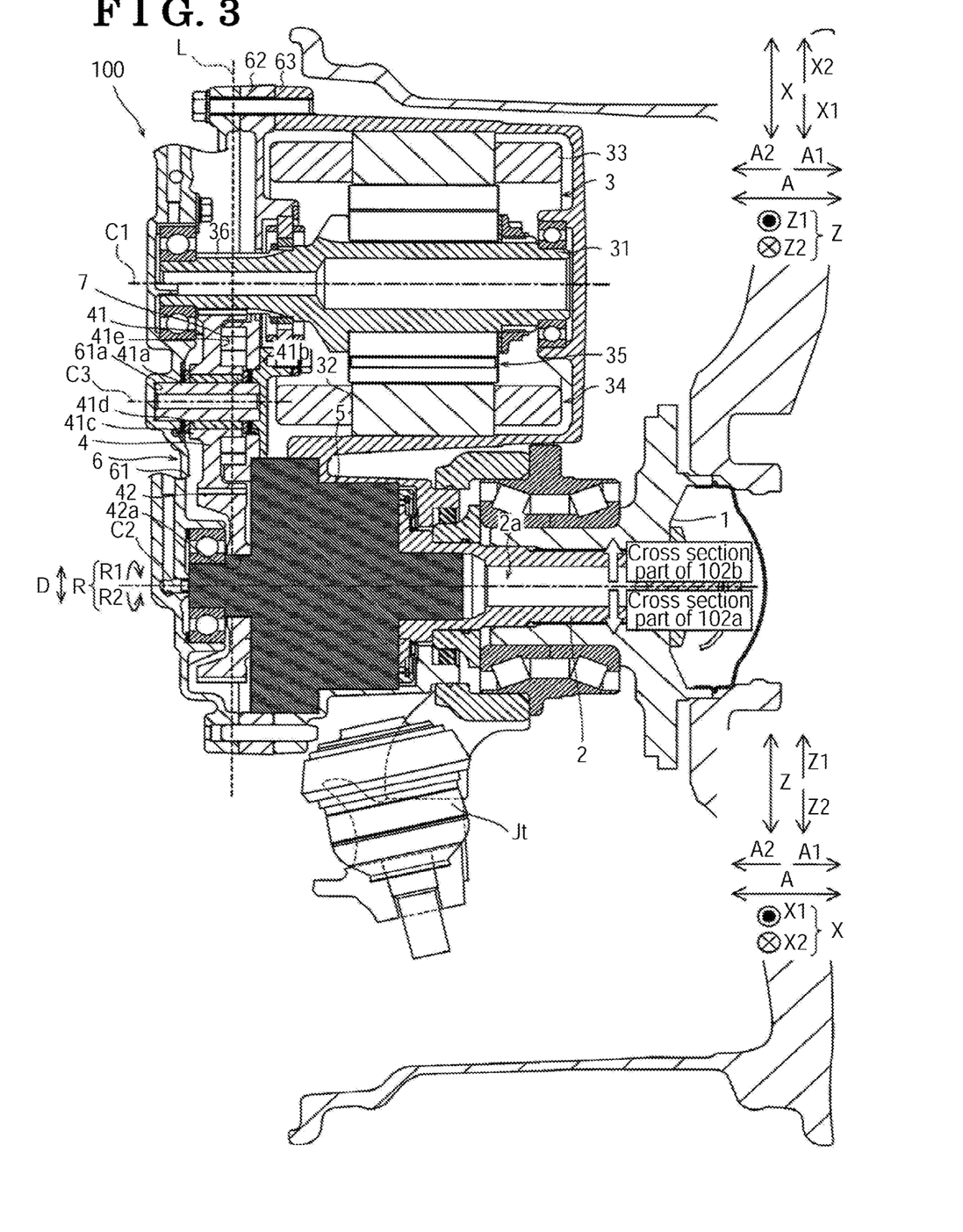
FIG. 3 is a cross sectional view taken along line 102-102 in FIG. 1.

As shown in FIGS. 2 and 3, a rotation center axis C1 of the electric motor 3, the rotation center axis C2 of the planetary gear mechanism 5, and a rotation center axis C3 of the oil pump 7 are aligned along the D direction. The planetary gear mechanism 5, the oil pump 7, and the electric motor 3 are aligned in this order outwardly in the D direction from inside thereof. Here, the electric motor 3 is arranged in the X2 direction of the X direction relative to the planetary gear mechanism 5. The electric motor 3 is separately arranged with respect to the planetary gear mechanism 5 in the D direction. Here, FIG. 3 is a cross sectional view taken along line 102-102 in FIG. 1 with the reference of the rotation center axis C2 having an area 102a at a lower part of the view and an area 102b at an upper part of the view, the area 102a and the area 102b connected at the rotation center axis C2.

The electric motor 3 generates the drive force to drive the vehicle. In particular, the electric motor 3 corresponds to an inner-rotor motor. That is, the electric motor 3 includes a motor shaft 31, a stator 34 including a stator core 32 and a stator coil 33, a rotor 35, and a drive gear 36 (i.e., serving as a drive gear).

The motor shaft 31 is rotatable about the rotation center axis C1 which extends along the A direction. The stator 34 rotates the motor shaft 31 about the rotation center axis C1. Specifically, the stator 34 includes the stator core 32 and the stator coil 33. The stator coil 33 generates a rotating magnetic field rotating the motor shaft 31 by being wound on the stator core 32. The drive gear 36 is arranged at an end portion of the motor shaft 31 in the A2 direction. The drive gear 36 includes outer teeth meshing with outer teeth 41g (see FIG. 6) of the idler gear 41 of the transmission mechanism 4. The drive gear 36 includes the diameter which is smaller than the diameter of the idler gear 41 and the diameter of a driven gear 42 of the transmission mechanism 4.

As such, the electric motor 3 includes the drive gear 36 generating the drive force for driving the wheel W and drives the drive gear 36.

The transmission mechanism 4 transmits the drive force of the electric motor 3 to the planetary gear mechanism 5. In particular, the transmission mechanism 4 includes the idler gear 41 and a driven gear 42. The transmission mechanism 4 transmits the drive force of the electric motor 3 to the planetary gear mechanism 5 by connecting the electric motor 3 thereto.

The idler gear 41 includes a gear portion 141 (see FIG. 6) having the outer teeth 41g which meshes with the drive gear 36 and the driven gear 42. Here, the outer teeth 41g of the idler gear 41 receives the drive force of the drive gear 36.

The idler gear 41 includes an idler pin 41a arranged along the rotation center axis C3 and is rotatably attached to the accommodation member 6.

Specifically, the idler gear 41 includes a cylindrical portion 41c including a through hole 41b into which the idler pin 41a is inserted, and being inserted by the idler pin 41a in the A direction. The idler gear 41 is rotatably attached to the idler pin 41a via a needle bearing 41d. The idler gear 41 includes a recess 41e which corresponds to a recess formed to decrease the weight of the idler gear 41. The recess 41e is formed such that one side surface of the idler gear 41 which is closer to the wheel W than the other side surface is recessed in the A2 direction, and contains an accommodation portion 172 (see FIG. 6) therein.

The driven gear 42 includes outer teeth meshing with outer teeth 41g of the idler gear 41, and is rotatably attached to the planetary gear mechanism 5. The driven gear 42 includes a shaft-press-fit hole 42a into which a part of the planetary gear mechanism 5 in the A2 direction is press fitted, and transmits the drive force to the shaft 2 via the planetary gear mechanism 5.

Here, the drive gear 36, the idler gear 41, and the driven gear 42 are linearly aligned along a direction (D direction) orthogonal to the extending direction of the rotation center axis C2.

Figure 4:
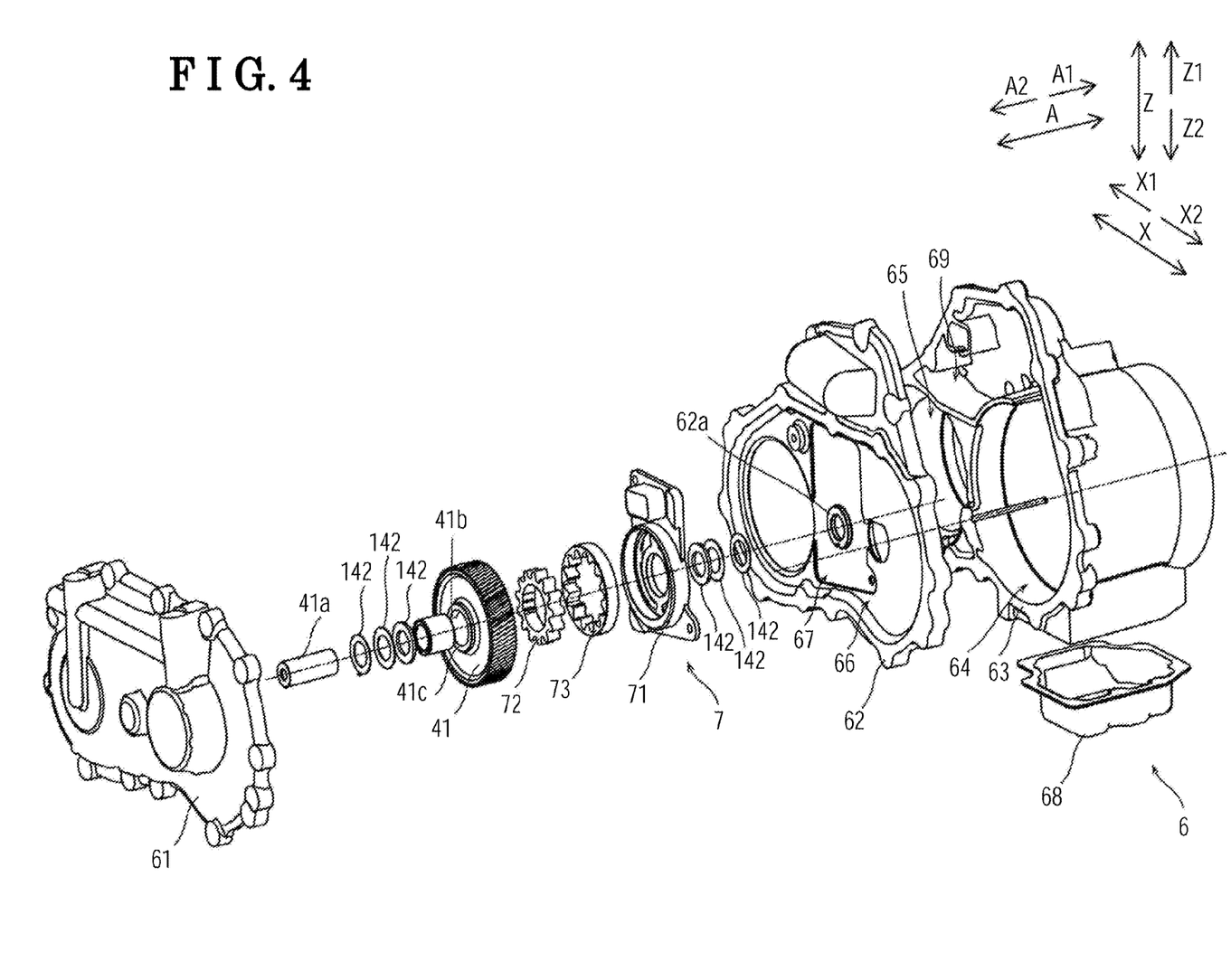
FIG. 4 is an exploded perspective view of the in-wheel motor vehicle drive device according to the embodiment.

As shown in FIG. 4, the accommodation member 6 contains the electric motor 3, the transmission mechanism 4, the planetary gear mechanism 5, and the oil pump 7 therein. Specifically, the accommodation member 6 includes a cover 61, a first case 62, and a second case 63.

The cover 61, the first case 62, and the second case 63 are aligned in this order from A2 direction. The first case 62 and the second case 63 form a motor accommodation space 64 and a planetary gear mechanism accommodation space 65 therebetween. The motor accommodation space 64 accommodates or contains the electric motor 3 therein. The planetary gear mechanism accommodation space 65 contains the planetary gear mechanism 5 therein. The motor accommodation space 64 and the planetary gear mechanism accommodation space 65 are arranged adjacent to each other in the D direction.

The cover 61 and the first case 62 form a transmission mechanism accommodation space 66 and an oil pump accommodation space 67 therebetween. The transmission mechanism accommodation space 66 contains the transmission mechanism 4 therein. The oil pump accommodation space 67 contains the oil pump 7 therein. The oil pump accommodation space 67 corresponds to a part of the transmission mechanism accommodation space 66. The cover 61 includes a recess 61a (see FIG. 3) into which an end portion of the idler pin 41a in the A2 direction is inserted. The first case 62 includes a recess 62a into which an end portion of the idler pin 41a in the A1 direction is inserted. As such, the idler pin 41a is attached so as not to rotate with the cover 61 and the first case 62. The idler pin 41a is attached to be sandwiched by the recess 61a of the cover 61 and the recess 62a of the first case 62. Alternatively, the idler pin 41a may be attached to the recess 61a of the cover 61 and the recess 62a of the first case 62 each via a needle bearing. Here, plural (for example, three) thrust washers 142 are attached to be sandwiched by the idler gear 41 and the cover 61. The number of the thrust washers 142 being sandwiched by the idler gear 41 and the cover 61 are not limited to three, and any required number of the thrust washers 142 may be used or employed.

The accommodation member 6 includes a lower oil tank 68 and an upper oil tank 69. The lower oil tank 68 accumulates oil introduced by the oil pump 7. The lower oil tank 68 is arranged in the Z2 direction of the second case 63. That is, the lower oil tank 68 is arranged in the Z2 direction with respect to the oil pump 7 and the electric motor 3. The upper oil tank 69 temporarily accumulates the oil discharged by the oil pump 7. The upper oil tank 69 is formed such that a recess of the second case 63 in the Z1 direction and the first case 62 are attached with each other. That is, the upper oil tank 69 is arranged in the Z1 direction with respect to the oil pump 7 and the electric motor 3.

The oil pump 7 is driven by the electric motor 3. In particular, the oil pump 7 includes a pump housing 71, an inner rotor 72 (i.e., serving as a first rotator), and an outer rotor 73 (i.e., serving as a second rotator). The pump housing 71, the inner rotor 72, and the outer rotor 73 are made of metal.

Figure 5:
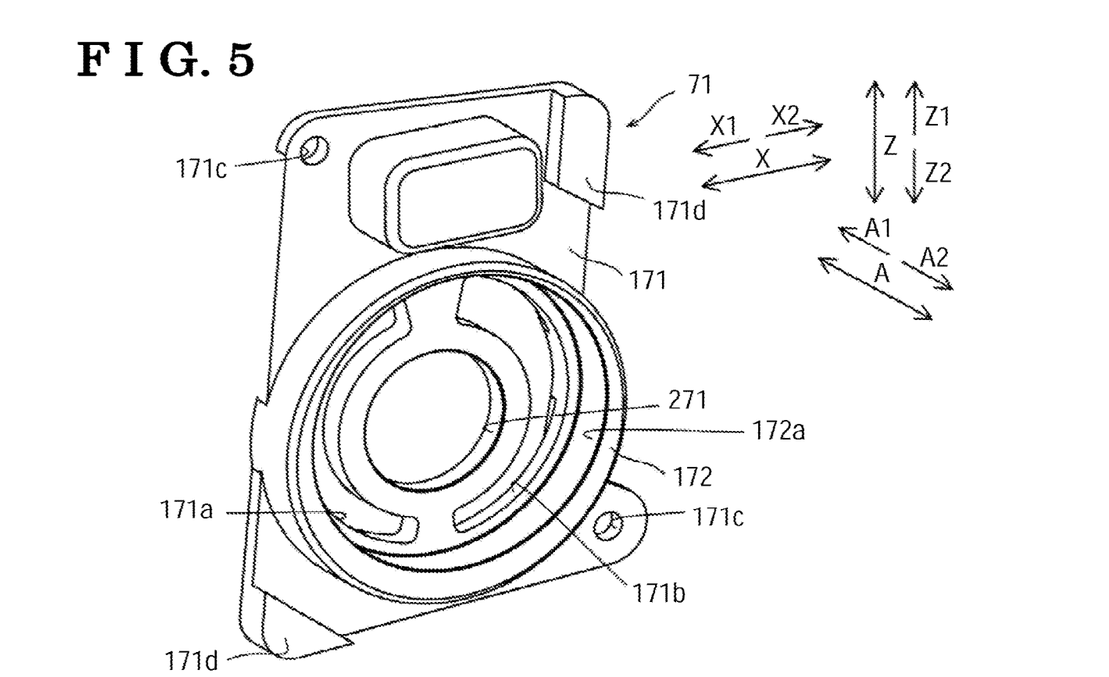
FIG. 5 is a perspective view of a pump plate of the in-wheel motor vehicle drive device of the embodiment.
Figure 6:
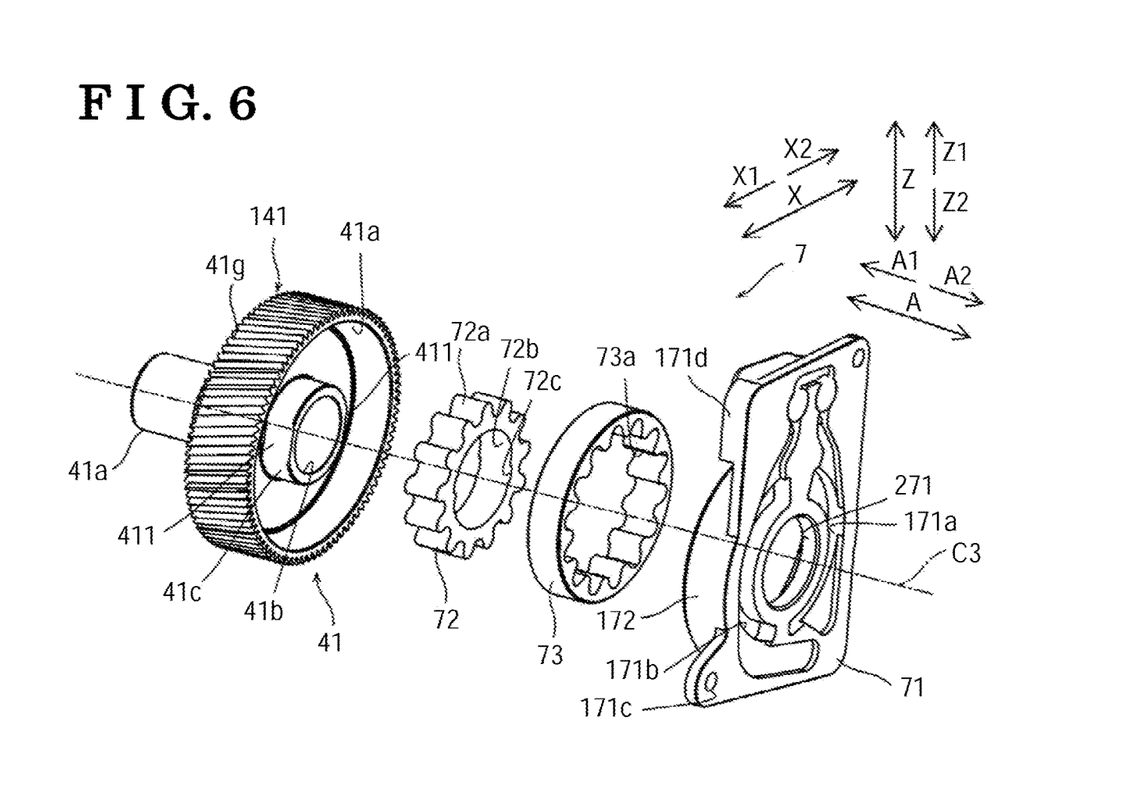
FIG. 6 is an exploded perspective view of an oil pump of the in-wheel motor vehicle drive device of the embodiment.

As shown in FIGS. 5 and 6, the pump housing 71 contains the inner rotor 72 and the outer rotor 73 therein. Specifically, the pump housing 71 includes a pump plate 171 (i.e., serving as an oil pump cover) and the accommodation portion 172.

The pump plate 171 is a thin plate, and includes a through hole 271 into which the idler pin 41a is inserted, the idler pin 41a for attaching the idler gear 41 to the accommodation member 6.

The pump plate 171 includes a first port 171a and a second port 171b which each corresponds to a through hole penetrating the pump plate 171 in the A direction. The pump plate 171 includes plural (for example, two) fastening holes 171c each into which a fastening member attaching the pump plate 171 to the first case 62 is inserted. The plural fastening holes 171c are diagonally arranged in the pump plate 171. The plural fastening holes 171c penetrate the pump plate 171 in the A direction. The pump plate 171 includes plural (for example, two) protrusions 171d sandwiched by the cover 61 and the first case 62. The plural protrusions 171d protrude in the A2 direction from the pump plate 171, and are diagonally arranged thereon.

Figure 7:
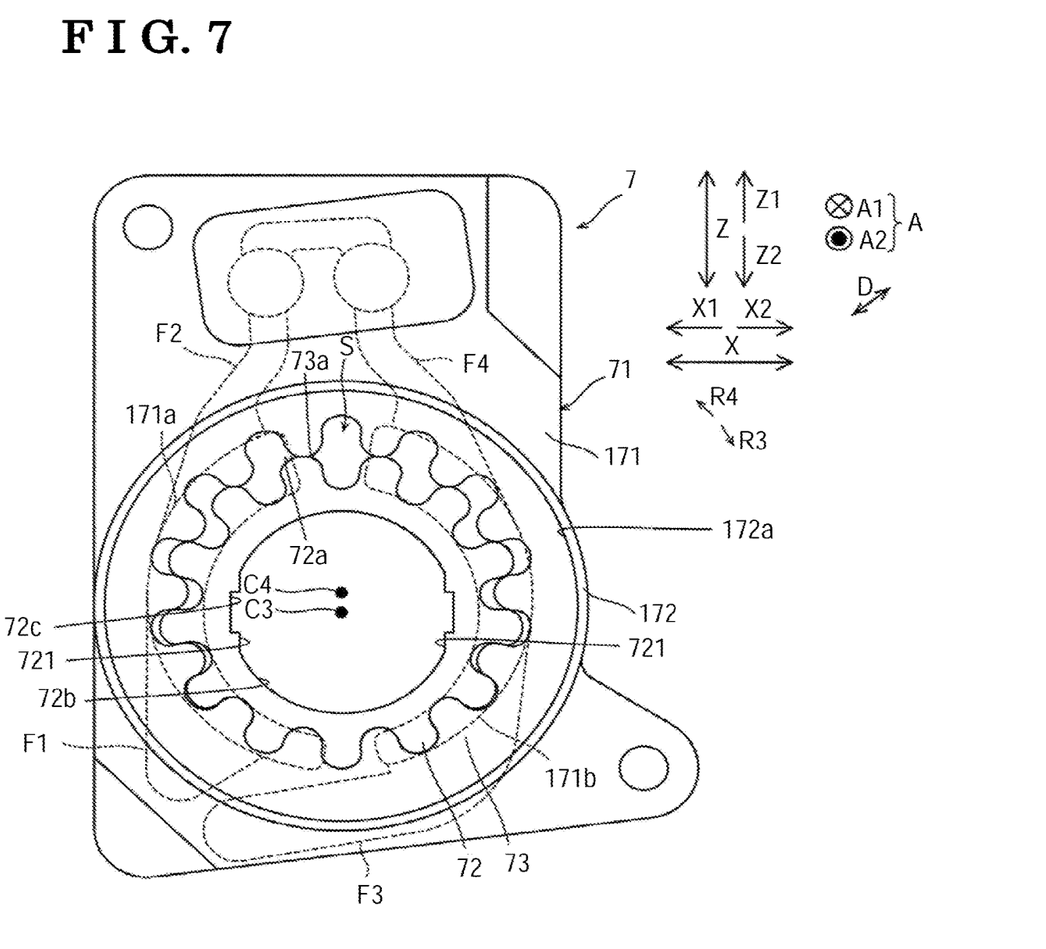
FIG. 7 is a front view of the oil pump of the in-wheel motor vehicle drive device of the embodiment when seen in an A2 direction.

As shown in FIGS. 6 and 7, the first port 171a and the second port 171b introduce the oil to a pump chamber S formed by the inner rotor 72 and the outer rotor 73 within the pump housing 71, and introduce or discharge the oil outside the pump chamber S. That is, the inner rotor 72 and the outer rotor 73 rotate together, and the oil pump 7 introduces and discharges oil to and from the pump chamber S.

The pump plate 171 includes a first introduction oil path F1, a first discharge oil path F2, a second introduction oil path F3, and a second discharge oil path F4. The first introduction oil path F1, the first discharge oil path F2, the second introduction oil path F3, and the second discharge oil path F4 each is a groove in which a surface of the pump plate 171 in the A1 direction is recessed in or toward the A2 direction. The first introduction oil path F1 corresponds to an oil path for introducing oil from the lower oil tank 68 to the first port 171a. The first discharge oil path F2 corresponds to an oil path for discharging oil from the first port 171a to the upper oil tank 69. The second introduction oil path F3 corresponds to an oil path for introducing oil from the lower oil tank 68 to the second port 171b. The second discharge oil path F4 corresponds to an oil path for discharging oil from the second port 171b to the upper oil tank 69.

The accommodation portion 172 is provided on a surface of the pump plate 171 in the A2 direction. The accommodation portion 172 includes a rotor accommodation space 172a (i.e., serving as a space) accommodating or containing the inner rotor 72 and the outer rotor 73 therein. The rotor accommodation space 172a is a recess recessed in or toward the A1 direction from an end surface of the pump plate 171 in the A2 direction.

The inner rotor 72 of the embodiment integrally rotates with the idler gear 41. The inner rotor 72 rotates the outer rotor 73 by rotating about the rotation center axis C3 which is eccentric to the rotation center axis C4 of the outer rotor 73. As such, the oil pump 7 introduces and discharges the oil by using or employing the rotation of the idler gear 41 instead of using the rotation of the drive gear 36 or the driven gear 42.

Specifically, the inner rotor 72 includes plural (for example, thirteen) outer teeth 72a, and includes a rotation-fix hole 72b. The rotation-fix hole 72b penetrates the inner rotor 72 in the A direction.

The rotation-fix hole 72b is inserted by a cylindrical portion 41c of the idler gear 41. The cylindrical portion 41c of the idler gear 41 and the rotation-fix hole 72b of the inner rotor 72 are engaged with each other by the surfaces having width across flats. That is, the cylindrical portion 41c of the idler gear 41 includes a pair of linear portions 411 facing each other in the D direction. The rotation-fix hole 72b of the inner rotor 72 includes a pair of linear portions 721 facing each other in the D direction. The pair of the linear portions 411 of the cylindrical portion 41c of the idler gear 41 and the pair of linear portions 721 of the rotation-fix hole 72b of the inner rotor 72 face each other to engage the idler gear 41 and the inner rotor 72 with each other, and the inner rotor 72 rotates in accordance with the idler gear 41.

The rotation-fix hole 72b includes plural (for example, two) oil grooves 72c which are recessed outwardly in the D direction. The plural oil grooves 72c extend along the A direction, and are arranged to face each other in the D direction.

The idler gear 41 and the inner rotor 72 are coaxially arranged on the rotation center axis C3. As such, the inner rotor 72 is separately provided and attached to the idler gear 41.

The outer rotor 73 is attached to the pump plate 171 so as to be rotatable therewith and meshes with the inner rotor 72. Specifically, the outer rotor 73 includes plural (for example, fourteen) inner teeth 73a meshing with the plural outer teeth 72a of the inner rotor 72. The outer teeth 72a of the inner rotor 72 are arranged inwardly of the outer rotor 73 so as to mesh with the inner teeth 73a of the outer rotor 73 from inward thereof. The number of the outer teeth 72 of the inner rotor 72 is less than the inner teeth 73a of the outer rotor 73 by one.

The inner rotor 72, the outer rotor 73, and the accommodation portion 172 are accommodated or contained in a recess 41e of the idler gear 41.

The inner rotor 72 rotates in the R3 direction or in the R4 direction and the outer rotor 73 rotates in accordance therewith. The outer teeth 72a of the inner rotor 72 and the inner teeth 73a of the outer rotor 73 mesh with each other at a side where the inner rotor 72 and the outer rotor 73 are close to each other. The outer teeth 72a and the inner teeth 73a have a clearance (the pump chamber S) therebetween instead of meshing with each other due to the shortage of the outer teeth 72a with respect to the inner teeth 73a by one at a side where the inner rotor 72 and the outer rotor 73 are away from each other at the time of the rotation.

Figure 8:
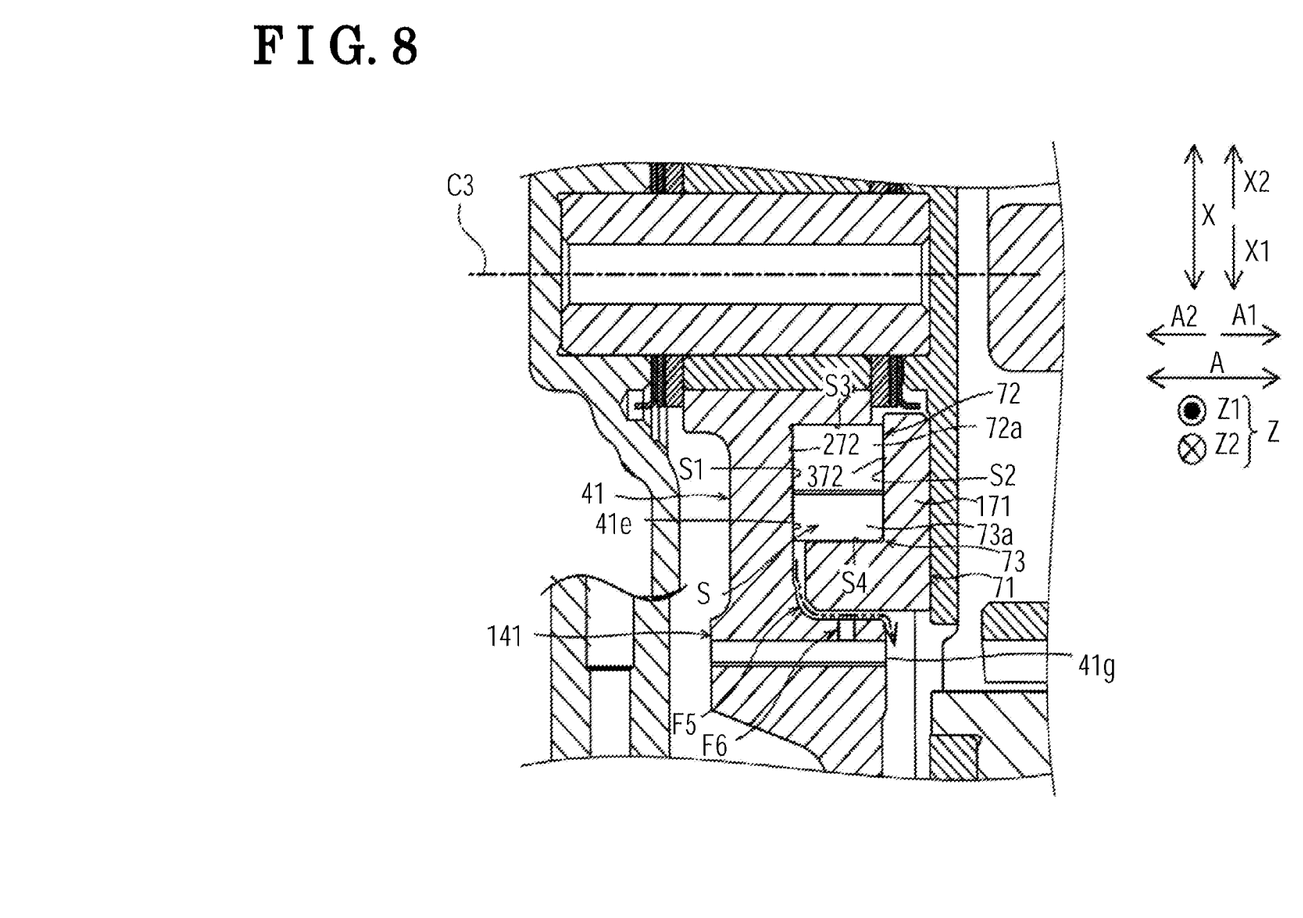
FIG. 8 is a cross sectional view of a pump chamber of the in-wheel motor vehicle drive device of the embodiment along a X direction.

As shown in FIGS. 7 and 8, a first wall surface S1, a second wall surface S2, a third wall surface S3, and a fourth wall surface S4 surround the pump chamber S.

The first wall surface S1 is provided at the idler gear 41 for forming the pump chamber S to and from where the oil is introduced and discharged. The first wall surface S1 extends in the X direction. The second wall surface S2 is provided at the pump plate 171 for forming the pump chamber S. The second wall surface S2 faces the first wall surface S1 in the A direction. The second wall surface S2 extends in the X direction.

The third wall surface S3 is provided at the outer teeth 72a of the inner rotor 72 for forming the pump chamber S. The third wall surface S3 extends in the A direction. The fourth wall surface S4 is provided at the inner teeth 73a of the outer rotor 73 for forming the pump chamber S. The fourth wall surface S4 extends in the A direction. The fourth wall surface S4 faces the third wall surface S3 in the X direction.

The inner rotor 72 and the outer rotor 73 (i.e., together, serving as a pump rotator) are provided between the first wall surface S1 of the idler gear 41 and the second wall surface S2 of the pump plate 171, and integrally rotate with the idler gear 41. The oil pump 7 is a trochoid oil pump.

The inner rotor 72 includes a first side surface 272 and a second side surface 372. The first side surface 272 is a surface in the A2 direction, the surface adjacently or closely facing the first wall surface S1. The second side surface 372 is a surface in the A1 direction, the surface adjacently facing the second wall surface S2. A first small clearance is provided between the first wall surface S1 and the first side surface 272 rotating in accordance with the rotation of the idler gear 41. A second small clearance is provided between the second wall surface S2 and the second side surface 372 rotating in accordance with the rotation of the idler gear 41.

An oil path F5 introducing the oil to the outer teeth 41g of the idler gear 41 is provided between the first wall surface S1 of the idler gear 41 and the pump plate 171. The oil path F5 is an oil path discharging the oil within the pump chamber S outside by the discharging pressure level.

The oil pump 7 penetrates the gear portion 141 of the idler gear 41, and includes lubricating holes F6 which communicates with the oil path F5. The flow path resistance of the lubricating hole F6 is smaller than that of the oil path F5. That is, the flow path width of the lubricating hole F6 is greater than the flow path width of the oil path F5. The lubricating holes F6 are arranged at equiangular intervals (for example, ninety degrees) at the gear portion 141. Alternately, the lubricating holes F6 do not have to be provided at the equiangular intervals (for example, ninety degrees) at the gear portion 141, and have only to be able to supply enough amount of oil to lubricate the outer teeth 41g of the idler gear 41.

As shown in FIG. 7, the inner rotor 72 and the outer rotor 73 increase and decrease the size of the pump chamber S by rotating the pump chamber S in the R3 direction or in the R4 direction to operate the pump function. For example, the inner rotor 72 and the outer rotor 73 move the pump chamber S in the R3 direction to increase the volume of the pump chamber S, and introduce the oil from the first port 171a to the pump chamber S. Here, the pressure level in the pump chamber S decreases (negative pressure). The volume of the pump chamber S decreases and the oil is discharged from the pump chamber S to the second port 171b. Here, the pressure level in the pump chamber S increases (positive pressure). Similarly, the inner rotor 72 and the outer rotor 73 move the pump chamber S in the R4 direction to increase the volume of the pump chamber S and the oil is introduced from the second port 171b to the pump chamber S. The pump chamber S decreases the volume thereof and the oil is discharged from the pump chamber S to the first port 171a.

Figure 9:
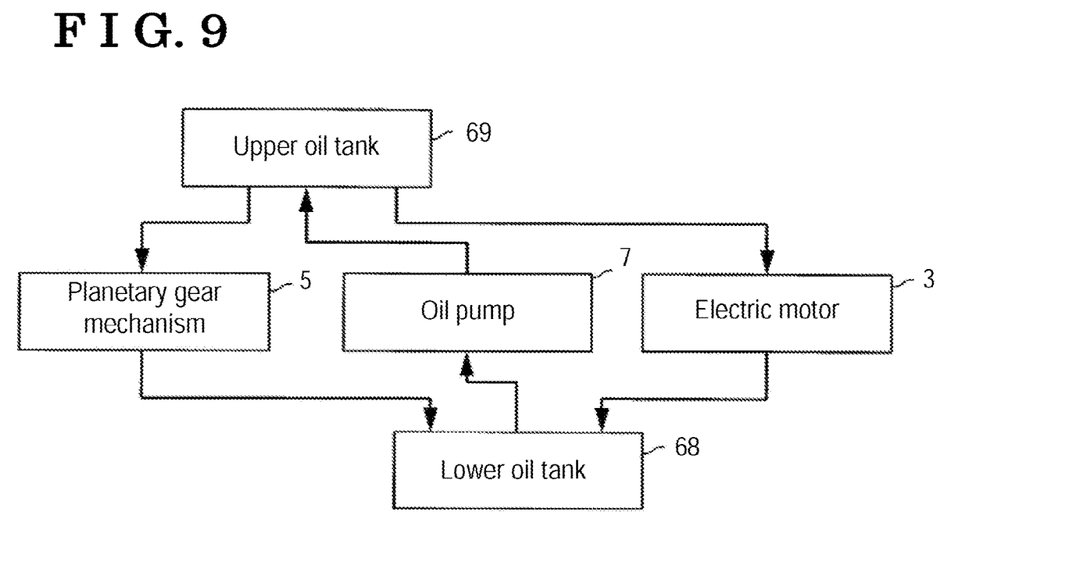
FIG. 9 is a schematic view illustrating a circulation of oil by the oil pump of the in-wheel motor vehicle drive device of the embodiment.

As shown in FIG. 9, in the in-wheel motor vehicle drive device 100, the oil introduced from the lower oil tank 68 by the oil pump 7 is supplied to the upper oil tank 69. The oil supplied to the upper oil tank 69 is supplied to the planetary gear mechanism 5 and the electric motor 3 by its own weight. The oil supplied to the planetary gear mechanism 5 and the electric motor 3 returns to the lower oil tank 68 by its own weight. In the in-wheel motor vehicle drive device 100, the oil circulates by the oil pump 7.

Figure 10:
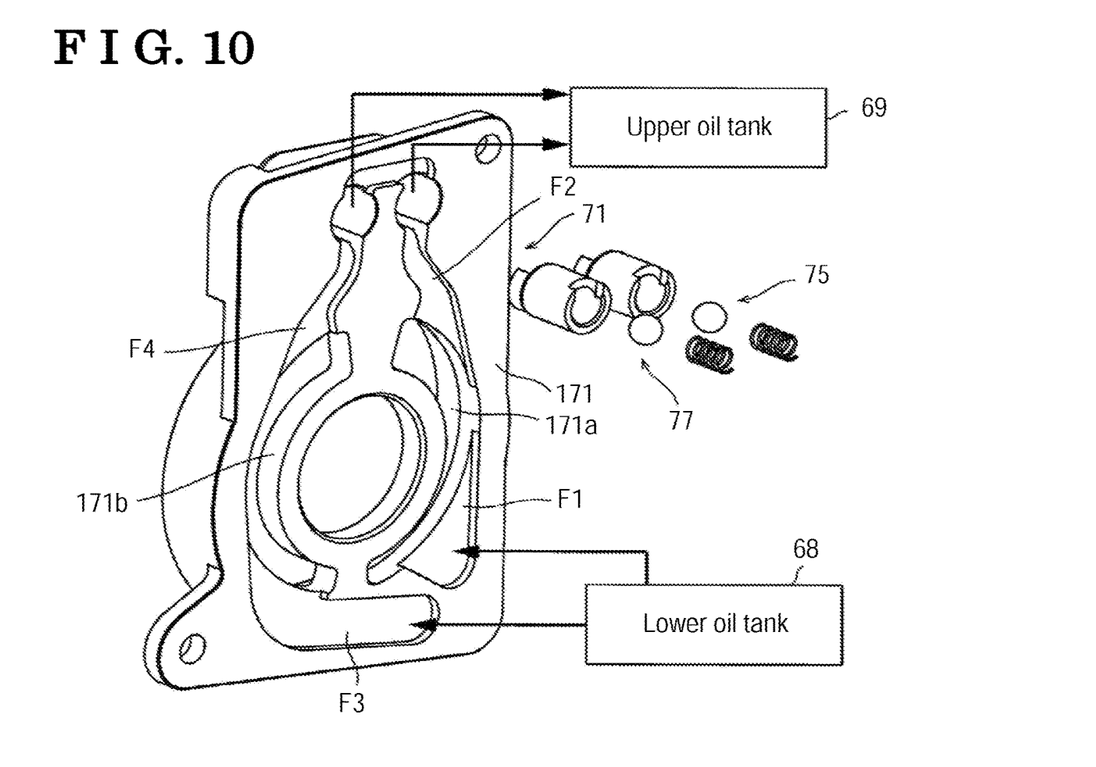
FIG. 10 is a perspective view illustrating a first discharge check valve and a second discharge check valve of the oil pump of the in-wheel motor vehicle drive device of the embodiment.
Figure 11:
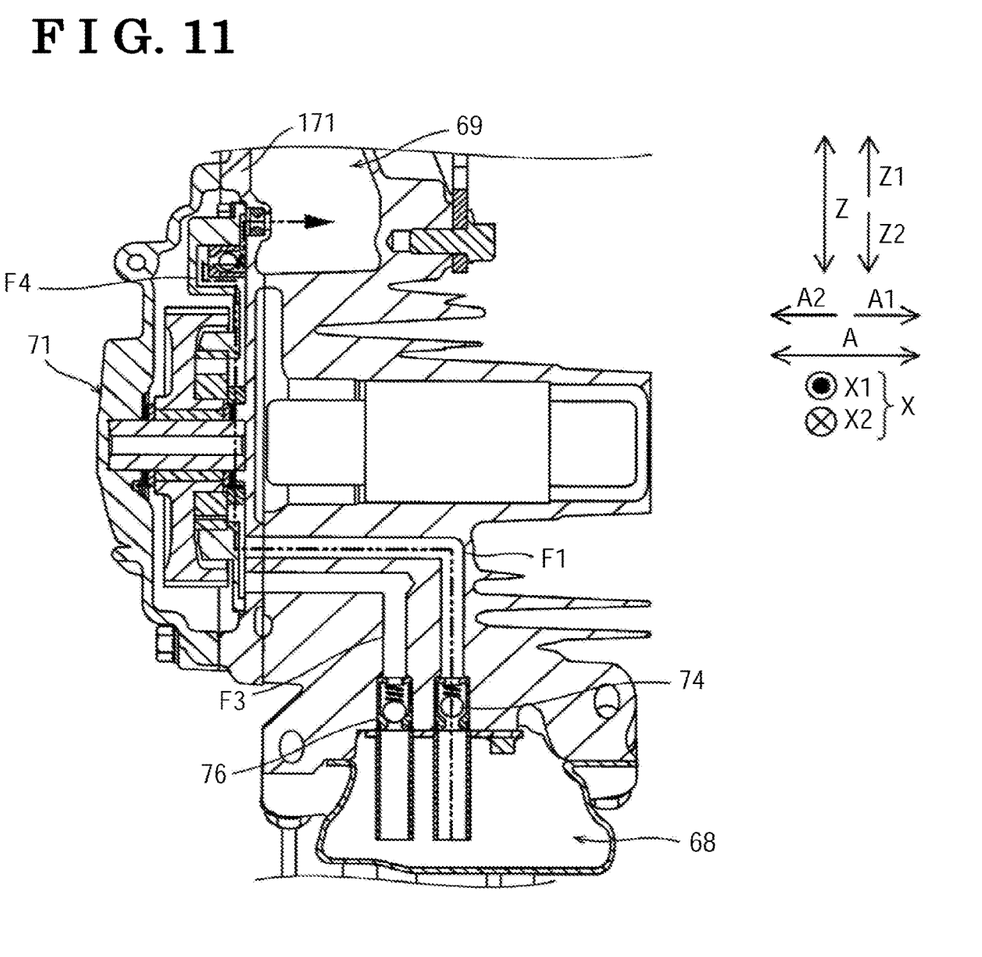
FIG. 11 is a cross sectional view of a first introduction check valve and a second introduction check valve of the oil pump of the in-wheel motor vehicle drive device of the embodiment along a Z direction.

As shown in FIGS. 10 and 11, the oil pump 7 switches the function of the introduction and discharge of the oil at the first port 171a and the second port 171b by the rotation direction of the inner rotor 72.

Specifically, the oil pump 7 includes a first introduction check valve 74, a first discharge check valve 75, a second introduction check valve 76, and a second discharge check valve 77. The first introduction check valve 74, the first discharge check valve 75, the second introduction check valve 76, and the second discharge check valve 77 each switches an open state and a closed state in accordance with or in response to the rotation of the inner rotor 72 in the R3 direction or in the R4 direction.

As shown with a two-dotted chain in FIG. 11, the first introduction check valve 74 and the second discharge check valve 77 turn in the open state by the rotation of the inner rotor 72 in the R3 direction, and the second introduction check valve 76 and the first discharge check valve 75 turn in the closed state. Accordingly, the oil pump 7 supplies the oil of the lower oil tank 68 to the upper oil tank 69 via the first introduction oil path F1 and the second discharge oil path F4.

The inner rotor 72 rotates in the R4 direction to open the second introduction check valve 76 and the first discharge check valve 75, and close the first introduction check valve 74 and the second discharge check valve 77. Accordingly, the oil pump 7 supplies oil of the lower oil tank 68 to the upper oil tank 69 via the second introduction oil path F3 and the first discharge oil path F2.

The following effects and advantages of the embodiment may be obtained.

In the aforementioned embodiment, the in-wheel motor vehicle drive device 100 includes the idler gear 41 and the oil pump 7. The idler gear 41 includes the first wall surface S1 for forming the pump chamber S into or from where the oil is introduced or discharged. The oil pump 7 is driven by the electric motor 3. The oil pump 7 includes the pump plate 171 including the second wall surface S2 facing the first wall surface S1 of the pump chamber S, and the inner rotor 72 and the outer rotor 73 which are arranged at the space (the rotor accommodation space 172a) between the first wall surface S1 of the idler gear 41 and the second wall surface S2 of the pump plate 171 and which are integrally rotating with the idler gear 41. Accordingly, the in-wheel motor vehicle drive device 100 may be provided with the pump chamber S of the oil pump 7 by using or employing the first wall surface S1 of the idler gear 41, and does not have to include a pump body having the first wall surface S1 as a dedicated member or an exclusive member of the oil pump 7. As a result, the number of components of the oil pump 7 may be decreased by not having the pump body having the first wall surface S1 as the dedicated member of the oil pump 7, and the dimension of the in-wheel motor vehicle drive device 100 in the A direction (an axial direction) may be inhibited from increasing. The idler gear 41, the inner rotor 72, and the outer rotor 73 integrally rotate with one another, and the difference of the relative rotation speed between the rotation speed of the idler gear 41 and the rotation speed of the inner rotor 72 and the outer rotor 73 may be inhibited from being generated, and the oil may be inhibited from changing its shape due to the rotation of the inner rotor 72 and the outer rotor 73, the oil accumulated in the first small space which is provided between the idler gear 41, the inner rotor 72, and the outer rotor 73. Thus, the sear resistance caused at the oil accumulated in the first small space when the inner rotor 72 and the outer rotor 73 rotate may be decreased. As a result, the torque for driving the oil pump 7 may be inhibited from increasing, and the drive efficiency of the oil pump 7 may be inhibited from being decreased. The oil pump including the inner rotor 72 and the outer rotor 73 integrally rotating with the idler gear 41 is used or employed, and unlike a case where the oil pump 7 including the inner rotor 72 and the outer rotor 73 rotating by a dedicated motor separately provided from the electric motor 3 is used or employed, a wire for the dedicated motor does not have to be provided. As a result, the upsizing and the complication of the in-wheel motor vehicle drive device 100 may be inhibited.

In the embodiment, as described above, the in-wheel motor vehicle drive device 100 includes the oil path F5 provided between the first wall surface S1 of the idler gear 41 and the pump plate 171 and introducing the oil to the outer teeth 41g of the idler gear 41. Accordingly, the outer teeth 41g of the idler gear 41 does not have to include a dedicated oil path introducing the oil thereto, and the oil path F5 serving as a clearance between the first wall surface S1 of the idler gear 41 and the pump plate 171 may be used to supply the oil to the outer teeth 41g of the idler gear 41.

According to the embodiment, as described above, the outer teeth 41g of the idler gear 41 is provided with the lubricating hole F6 which penetrates therethrough and communicates with the oil path F5. Accordingly, the oil may be further directly supplied to the teeth surface (the surface) of the outer teeth 41g of the idler gear 41, and the idler gear 41 may further smoothly rotate.

According to the embodiment, as described above, the oil pump 7 is configured such that the outer rotor 73 rotates with the inner rotor 72 to introduce and discharge the oil to and from the pump chamber S. The inner rotor 72 and the outer rotor 73 rotating by using or employing the rotation of the idler gear 41 configure the oil pump as a gear pump introducing and discharging the oil, and the drive source rotating the inner rotor 72 and the outer rotor 73 does not have to be separately provided. As a result, the increase of the number of components, and the complication of the structure of the in-wheel motor vehicle drive device 100 may be inhibited.

According to the embodiment, as described above, the oil pump 7 is configured such that, as the idler gear 41 switches the rotation direction thereof, the introduction and discharge of the oil may be switched at the first port 171a and the second port 171b. Accordingly, the oil pump 7 may introduce and discharge the oil regardless of the rotation direction of the idler gear 41, and the oil may be supplied to each of the components of the in-wheel motor vehicle drive device 100 irrespective of whether the vehicle moves forward or backward.

According to the embodiment, as described above, the idler gear 41 includes a recess 41e recessed in the A2 direction to accommodate the inner rotor 72 and the outer rotor 73 therein. The inner rotor 72 and the outer rotor 73 integrally rotate with the idler gear 41 by the driving of the drive gear 36. Accordingly, the inner rotor 72 and the outer rotor 73 are contained in the recess 41e of the idler gear 41, and the oil pump 7 may be inhibited from upsizing in the A direction, meaning that the in-wheel motor vehicle drive device 100 may be inhibited from increasing the dimension thereof in the axial direction.

Modified examples of the embodiment will be explained below.

For example, in the aforementioned embodiment, the oil pump 7 is a trochoid oil pump. Alternately, in this disclosure, the oil pump may be a cyclone oil pump or a vane oil pump.

In the aforementioned embodiment, the cylindrical portion 41c of the idler gear 41 and the rotation-fix hole 72b of the inner rotor 72 engage with each other by the surfaces having width across flats. Alternatively, the cylindrical portion of the idler gear and the fastening hole of the inner rotor may be attached to each other by spline fitting, keyway fitting, or a using a pin.

In the aforementioned embodiment, the inner rotor 72 which is made of metal is separately attached to the idler gear 41 which is made of metal. Alternately, in the disclosure, the inner rotor and the idler gear may be integrally formed.

According to aforementioned embodiment, the in-wheel motor vehicle drive device 100 includes the electric motor 3 including the drive gear 36 generating drive force for driving the wheel W, the electric motor 3 driving the drive gear 36, and the driven gear (the idler gear 41) including the gear portion 141 configured to receive drive force of the drive gear 36, and the first wall surface S1 extending along the direction orthogonal to the extending direction of the rotation center axis C3 of the gear portion 141, the first wall surface S1 forming the pump chamber S to and from which the oil is introduced and discharged. The in-wheel motor vehicle drive device 100 further includes the hub 1 transmitting the drive force of the driven gear (the idler gear) to the wheel W, and the oil pump 7 driven by the electric motor 3. The oil pump 7 includes the oil pump cover (the pump plate 171) including the second wall surface S2 facing the first wall surface S1 of the pump chamber S, and the pump rotator (the inner rotor 72, the outer rotor 73) arranged at the space between the first wall surface S1 of the driven gear (the idler gear 41) and the second wall surface S2 of the oil pump cover (the pump plate 171), the pump rotator (the inner rotor 72, the outer rotor 73) integrally rotating with the driven gear (the idler gear 41).

In the aforementioned embodiment, the in-wheel motor vehicle drive device 100 includes the idler gear 41 and the oil pump 7. The idler gear 41 includes the first wall surface S1 for forming the pump chamber S into or from where the oil is introduced or discharged. The oil pump 7 is driven by the electric motor 3. The oil pump 7 includes the pump plate 171 including the second wall surface S2 facing the first wall surface S1 of the pump chamber S, and the inner rotor 72 and the outer rotor 73 which are arranged at the space (the rotor accommodation space 172a) between the first wall surface S1 of the idler gear 41 and the second wall surface S2 of the pump plate 171 and which integrally rotate with the idler gear 41. Accordingly, the in-wheel motor vehicle drive device 100 may be provided with the pump chamber S of the oil pump 7 by using or employing the first wall surface S1 of the idler gear 41, and does not have to include a pump body having the first wall surface S1 as a dedicated member or an exclusive member of the oil pump 7. As a result, the number of components of the oil pump 7 may be decreased by not having the pump body having the first wall surface S1 as the dedicated member of the oil pump 7, and the dimension of the in-wheel motor vehicle drive device 100 in the A direction (an axial direction) may be inhibited from increasing. The idler gear 41, the inner rotor 72, and the outer rotor 73 integrally rotate with one another, and the difference of the relative rotation speed between the rotation speed of the idler gear 41 and the rotation speed of the inner rotor 72 and the outer rotor 73 may be inhibited from being generated, and the oil may be inhibited from changing its shape due to the rotation of the inner rotor 72 and the outer rotor 73, the oil accumulated in the first small space which is provided between the idler gear 41, the inner rotor 72, and the outer rotor 73. Thus, the sear resistance caused at the oil accumulated in the first small space when the inner rotor 72 and the outer rotor 73 rotate may be decreased. As a result, the torque for driving the oil pump 7 may be inhibited from increasing, and the drive efficiency of the oil pump 7 may be inhibited from being decreased. The oil pump including the inner rotor 72 and the outer rotor 73 integrally rotating with the idler gear 41 is used or employed, and unlike a case where the oil pump 7 including the inner rotor 72 and the outer rotor 73 rotating by a dedicated motor separately provided from the electric motor 3 is used or employed, a wire for the dedicated motor does not have to be provided. As a result, the upsizing and the complication of the in-wheel motor vehicle drive device 100 may be inhibited.

According to the aforementioned embodiment, the in-wheel motor vehicle drive device 100 further includes the outer teeth 41g provided at the gear portion 141 of the driven gear (the idler gear 41), the outer teeth 41g meshing with the drive gear 36, and the oil path F5 formed between the first wall surface S1 of the driven gear (the idler gear 41) and the oil pump cover (the pump plate 171), the oil path F5 introducing the oil to the outer teeth 41g of the driven gear (the idler gear 41).

In the embodiment, as described above, the in-wheel motor vehicle drive device 100 includes the oil path F5 provided between the first wall surface S1 of the idler gear 41 and the pump plate 171 and introducing the oil to the outer teeth 41g of the idler gear 41. Accordingly, the outer teeth 41g of the idler gear 41 does not have to include a dedicated oil path introducing oil thereto, and the oil path F5 serving as a clearance between the first wall surface S1 of the idler gear 41 and the pump plate 171 may be used to supply the oil to the outer teeth 41g of the idler gear 41.

According to the aforementioned embodiment, the gear portion 141 of the driven gear (the idler gear 41) includes the lubricating hole F6 provided to penetrate the gear portion 141, the lubricating hole F6 communicating with the oil path F5.

According to the embodiment, as described above, the outer teeth 41g of the idler gear 41 is provided with the lubricating hole F6 which penetrates therethrough and communicates with the oil path F5. Accordingly, the oil may be further directly supplied to the teeth surface (the surface) of the outer teeth 41g of the idler gear 41, and the idler gear 41 may further smoothly rotate. According to the aforementioned embodiment, the pump rotator (the inner rotor 72, the outer rotor 73) includes the first rotator (the inner rotor 72) attached to the driven gear (the idler gear 41), and the second rotator (the outer rotor 73) attached to the oil pump cover (the pump plate 171) so as to be rotatable therewith, the second rotator (the outer rotor 73) meshing with the first rotator (the inner rotor 72). The oil pump 7 is configured to introduce the oil to the pump chamber S and to discharge the oil from the pump chamber S by rotation of the second rotator (the outer rotor 73) in accordance with rotation of the first rotator (the inner rotor 72).

According to the embodiment, as described above, the oil pump 7 is configured such that the outer rotor 73 rotates with the inner rotor 72 to introduce and discharge the oil to and from the pump chamber S. The inner rotor 72 and the outer rotor 73 rotating by using or employing the rotation of the idler gear 41 configure the oil pump as a gear pump introducing and discharging the oil, and the drive source rotating the inner rotor 72 and the outer rotor 73 does not have to be separately provided. As a result, the increase of the number of components, and the complication of the structure of the in-wheel motor vehicle drive device 100 may be inhibited.

According to the aforementioned embodiment, the oil pump cover (the pump plate 171) includes the first port 171a and the second port 171b introducing the oil to the pump chamber S and introducing the oil to outside the pump chamber S. The oil pump 7 is configured to switch introduction and discharge of the oil at the first port 171a and the second port 171b in accordance with the switch of the rotation direction of the driven gear (the idler gear 41).

According to the embodiment, as described above, the oil pump 7 is configured such that, as the idler gear 41 switches the rotation direction thereof, the introduction and discharge of the oil may be switched at the first port 171a and the second port 171b. Accordingly, the oil pump 7 may introduce and discharge the oil regardless of the rotation direction of the idler gear 41, and the oil may be supplied to each of the components of the in-wheel motor vehicle drive device 100 irrespective of whether the vehicle moves forward or backward.

According to the aforementioned embodiment, the driven gear (the idler gear 41) includes the recess 41e on one side surface which is closer to the wheel W than the other side surface, the recess 41e recessed in a direction opposite to the wheel W, the recess 41e containing the pump rotator (the inner rotor 72, the outer rotor 73) therein. The pump rotator (the inner rotor 72, the outer rotor 73) is configured to integrally rotating with the driven gear (the idler gear 41) by driving of the drive gear 36.

According to the embodiment, as described above, the idler gear 41 includes a recess 41e recessed in the A2 direction to accommodate the inner rotor 72 and the outer rotor 73 therein. The inner rotor 72 and the outer rotor 73 integrally rotate with the idler gear 41 by the driving of the drive gear 36. Accordingly, the inner rotor 72 and the outer rotor 73 are contained in the recess 41e of the idler gear 41, and the oil pump 7 may be inhibited from upsizing in the A direction, meaning that the in-wheel motor vehicle drive device 100 may be inhibited from increasing the dimension thereof in the axial direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An in-wheel motor vehicle drive device, comprising:
   an electric motor including a drive gear generating drive force for driving a wheel, the electric motor driving the drive gear;
   a driven gear including
      a gear portion configured to receive the drive force of the drive gear; and
      a first wall surface extending along a direction orthogonal to an extending direction of a rotation center axis of the gear portion, the first wall surface for forming a pump chamber to and from which oil is introduced and discharged;
   a hub configured to transmit the drive force of the driven gear to the wheel; and
   an oil pump driven by the electric motor; wherein
   the oil pump includes
      an oil pump cover including a second wall surface facing the first wall surface of the pump chamber; and
      a pump rotator arranged at a space between the first wall surface of the driven gear and the second wall surface of the oil pump cover, the pump rotator integrally rotating with the driven gear.

2. The in-wheel motor vehicle drive device according to claim 1, further comprising
   outer teeth provided at the gear portion of the driven gear, the outer teeth meshing with the drive gear; and
   an oil path formed between the first wall surface of the driven gear and the oil pump cover, the oil path introducing the oil to the outer teeth of the driven gear.

3. The in-wheel motor vehicle drive device according to claim 2, wherein the gear portion of the driven gear includes a lubricating hole provided to penetrate the gear portion, the lubricating hole communicating with the oil path.

4. The in-wheel motor vehicle drive device according to claim 1, wherein
   the pump rotator includes
      a first rotator attached to the driven gear; and
      a second rotator attached to the oil pump cover so as to be rotatable therewith, the second rotator meshing with the first rotator; and
   the oil pump is configured to introduce the oil to the pump chamber and to discharge the oil from the pump chamber by rotation of the second rotator in accordance with rotation of the first rotator.

5. The in-wheel motor vehicle drive device according to claim 1, wherein
   the oil pump cover includes a first port and a second port introducing the oil to the pump chamber and introducing the oil to outside the pump chamber; and
   the oil pump is configured to switch introduction and discharge of the oil at the first port and the second port in accordance with a switch of a rotation direction of the driven gear.

6. The in-wheel motor vehicle drive device according to claim 1, wherein
   the driven gear includes a recess on one side surface which is closer to the wheel than the other side surface, the recess recessed in a direction opposite to the wheel, the recess containing the pump rotator therein; and
   the pump rotator is configured to integrally rotating with the driven gear by driving of the drive gear.

* * * * *